July 10, 1934.　　　J. S. WALCH　　　1,965,869
HEADLIGHT
Filed Jan. 7, 1931　　　2 Sheets-Sheet 1
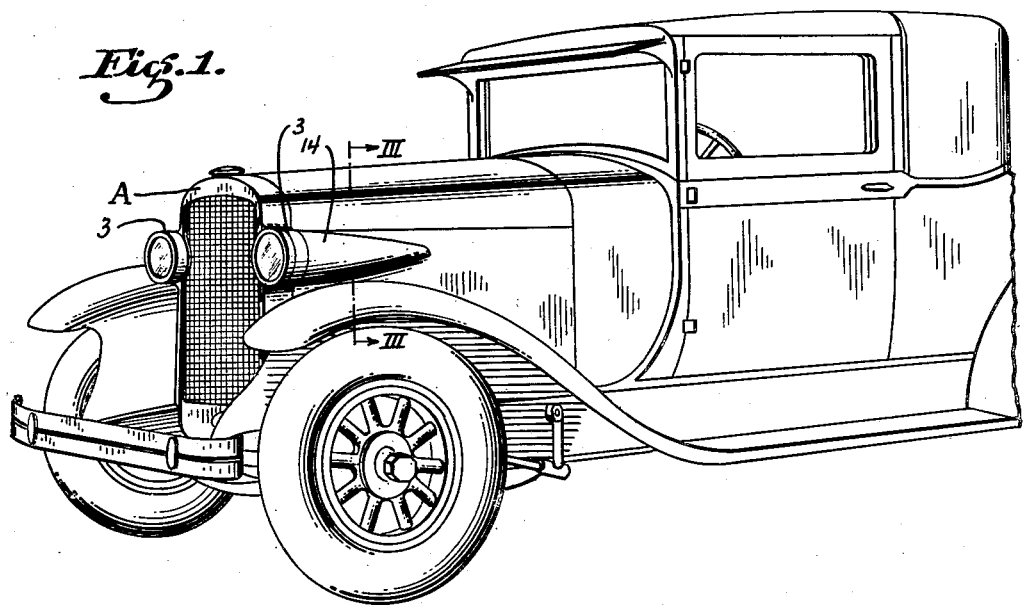
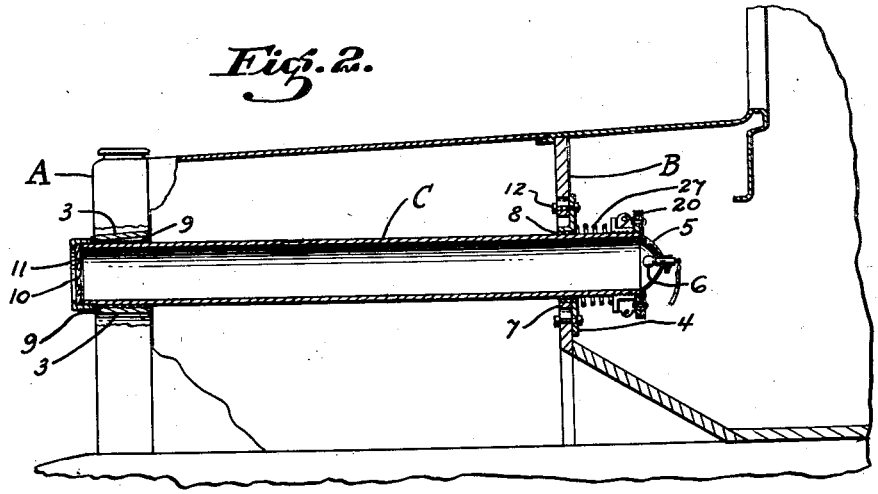
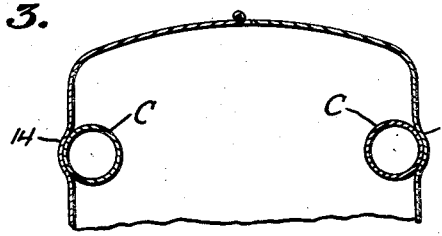
INVENTOR.
Jacob S. Walch.
BY Townsend, Loftus & Abbott
ATTORNEYS.

July 10, 1934.  J. S. WALCH  1,965,869
HEADLIGHT
Filed Jan. 7, 1931  2 Sheets-Sheet 2

INVENTOR.
Jacob S. Walch.
BY
Townsend, Loftus & Abbett
ATTORNEYS.

Patented July 10, 1934

1,965,869

UNITED STATES PATENT OFFICE 1,965,869

HEADLIGHT

Jacob S. Walch, San Francisco, Calif., assignor of one-fifth to Francis Marion Grissel, Stockton, Calif.

Application January 7, 1931, Serial No. 507,160

10 Claims. (Cl. 240—8.11)

This invention relates to a headlight for motor vehicles and the like and especially to a headlight in which the main beam projected may be materially intensified and the direct spreading rays emitted by the filament of the headlight bulb reduced to a minimum.

The object of the present invention is to generally improve the construction and operation of headlights of the character described; to provide a headlight employing a parabolic or like reflector capable of projecting a beam of parallel rays and in conjunction therewith an elongated tube through which the beam of parallel rays is projected, said tube having an interior surface whereby some of the direct rays from the filament are substantially dissipated while the remaining direct rays are reflected and projected together with the parallel rays; to provide a tube and a cooperating reflector adapted to be supported at its forward or projecting end by the radiator of an automobile and at the rear end by the dashboard; to provide means whereby the reflector and the rear end of the tube may be vertically adjusted to raise or lower the projected beam of light; and, further, to provide means whereby the tube may be readily removed with relation to the reflector and radiator when necessary.

The headlight is shown by way of illustration in the accompanying drawings, in which—

Fig. 1 is a perspective view of the headlight applied to an automobile,

Fig. 2 is a central, vertical section through the headlight and cooperating tube showing it positioned in an automobile, Fig. 3 is a cross section taken on line III—III of Fig. 1.

Figure 4:
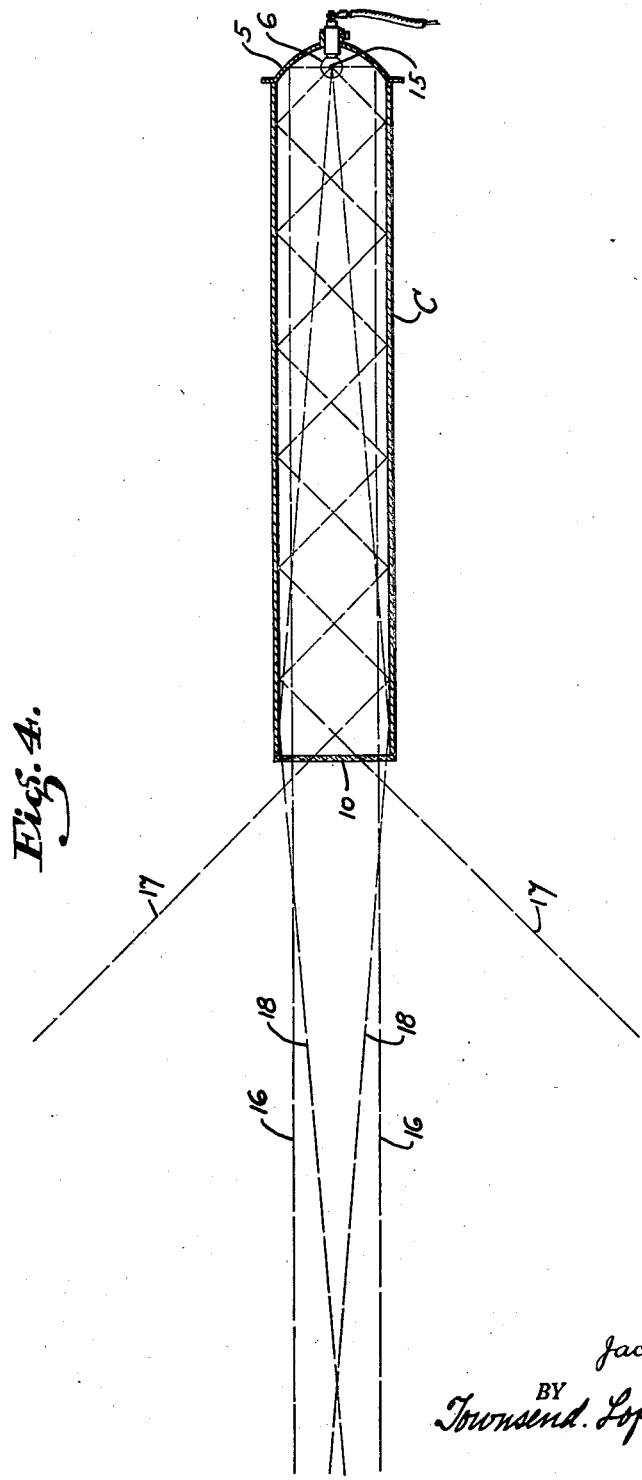
Fig. 4 is a diagrammatic view showing the manner in which the light rays are projected.

Referring to the drawings in detail and particularly Figs. 1 and 2, A indicates in general the radiator of an automobile and B the dashboard. The frame of the radiator is in this instance enlarged on opposite sides to form supports 3 for the forward ends of a pair of projecting tubes generally indicated at C. The tubes C are identical in construction and mounting and the description of one will accordingly suffice.

Adjustably secured to the dashboard B is a supporting plate 4. The plate is provided with an annular flange 7 on its forward face interior of which is mounted a felt or like washer 8 which forms a packing and a support for the inner end of the tube C. The forward end of the tube as previously stated is supported in the frame 3 forming a part of the radiator, it is surrounded by a felt washer 9, and carries a transparent closure 10 and a screw cap 11. The frame section 3 is slightly cone-shaped as shown to permit vertical adjustment of the opposite end of tube C so that the projected beam or light rays may be raised or lowered to project the light at the proper distance ahead of the car. The vertical adjustment of the reflector and the rear end of the tube may be accomplished in any suitable manner, for instance, by slotting the dashboard B and extending clamping bolts 12 therethrough which may be tightened when the desired adjustment is secured.

The rear end of the tube is exteriorly threaded to receive a flanged sleeve 20 which carries a parabolic or like reflector 5 and an electric bulb 6, the filament of which is disposed substantially in the focal center of the reflector. One end of the sleeve is split longitudinally and provided with clamping screws to lock the sleeve on the tube, to prevent unscrewing or accidental removal. A spring 27 surrounds the inner end of the tube and is interposed between the sleeve and the supporting plate 4. The spring exerts an endwise pressure on the tube and resiliently secures it in the respective supporting members 3 and 4 against endwise movement. By releasing the clamping screws, sleeve 20 together with the reflector supported thereby may be unscrewed and removed thus releasing the tube C and permitting it to be removed endwise from the supports 3 and 4, thus clearing the space between the hood and the engine of the automobile in case of engine repairs or the like.

Due to the fact that the headlight tubes are supported partially by the radiator and partially by the dashboard it is necessary to bulge the hood sections as indicated at 14. The hood may for this reason be raised or lowered in the usual manner when access to the motor is desired and if the tubes C interfere with the work in hand they may be readily removed endwise through the frame section 3 as previously described. The enlarging of the radiator frame to receive the tubes C and support the same does not detract from ornamental appearance but, if anything, enhances the same.

The tube C is provided with an interior reflecting surface and its function will be better understood by reference to Fig. 4. This figure is purely diagrammatic and illustrates the manner in which some of the direct rays emitted by the filament of the bulb 6 are dissipated while the remaining rays are projected together with the parallel rays projected by the parabolic reflector 5. In Fig. 4, 15 indicates the focal center or source of light and 5 the reflector. The parallel rays projected by the reflector pass through the tube and through the transparent closure 10 and are indicated by the lines 16—16. The direct rays from the filament striking the inner end of the tube are reflected as indicated by the lines 17—17 due to the fact that they are reflected back and forth so many times in passing through the tube the light power is so dissipated that the rays of light 17 finally projected are so reduced in intensity as to prevent any blinding effect. The direct rays of light emitted by the filament and striking the outer end of the tube are indicated by the lines 18—18. These rays are not exactly parallel to the rays in the main beam 16 but they are substantially so and as such materially add to the light beam projected by the reflector 5, thus giving better visibility forward of the car due to the greater amount of light projected. Thus by providing the tube C direct rays which ordinarily escape from a headlight and which cause a blinding effect are substantially dissipated in the present instance as indicated by the lines 17 while the direct rays striking the outer end of the tube are projected together with the rays forming the main beam 16 thus intensifying the same. In fact the parallel rays projected by the reflector 5 form one beam while the direct rays 18 reflected by the outer end of the tube form a second beam of light. The rays of the two beams, however, intermingle and are of substantially the same light intensity so that when the headlights are directed against a target for instance one hundred feet away the two beams projected are so uniform in light intensity that one blends into the other and they cannot be distinguished.

While the headlight has been shown and described as mounted on an automobile it is obvious that it may be mounted on other vehicles, such as street cars, railways, ships, and so on and while certain features are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. The combination with the radiator and the dashboard of an automobile, of a pair of tubes disposed one on each side of the radiator, said tubes supported at their forward ends by the radiator and at their rear ends by the dashboard, and a source of light and a cooperating parabolic reflector secured to the rear end of each tube and adapted to project a beam of parallel rays through the forward end of each tube.

2. The combination with the radiator and the dashboard of an automobile, of a pair of tubes disposed one on each side of the radiator, said tubes supported at their forward ends by the radiator and at their rear ends by the dashboard, a source of light and a cooperating parabolic reflector secured to the rear end of each tube and adapted to project a beam of parallel rays through the forward end of each tube, and an adjustable connection between the dashboard and the rear end of each tube whereby the rear ends of the tubes and the reflectors carried thereby may be vertically adjusted.

3. The combination with the radiator and the dashboard of an automobile, of an extension formed one on each side of the radiator, each extension having an opening formed therein, a pair of tubes one on each side of the radiator having their forward ends projecting through and supported in the openings formed in the radiator extensions and having their rear ends supported by the dashboard, and a source of light and a cooperating parabolic reflector secured to the rear end of each tube and adapted to project a beam of parallel rays through the forward end of each tube.

4. The combination with the radiator and the dashboard of an automobile, of an extension formed one on each side of the radiator, each extension having an opening formed therein, a pair of tubes one on each side of the radiator having their forward ends projecting through and supported in the openings formed in the radiator extensions and having their rear ends supported by the dashboard, a source of light and a cooperating parabolic reflector secured to the rear end of each tube and adapted to project a beam of parallel rays through the forward end of each tube, the openings formed in the radiator extensions being substantially cone-shaped in longitudinal section to permit the rear ends of the tubes to be raised or lowered in a vertical direction, and an adjustable connection between the dashboard and each tube whereby the rear ends of the tubes and the reflectors carried thereby may be vertically adjusted.

5. The combination with the radiator and the dashboard of an automobile, of an extension formed one on each side of the radiator, each extension having an opening formed therein, a pair of tubes one on each side of the radiator having their forward ends projecting through and supported in the openings formed in the radiator extensions and having their rear ends supported by the dashboard, a source of light and a cooperating parabolic reflector secured to the rear end of each tube and adapted to project a beam of parallel rays through the forward end of each tube, a collar on the forward end of each tube and engaging the front face of each radiator extension, and spring actuated means exerting an endwise pull on each tube to maintain the collars in engagement with the front faces of the radiator extensions.

6. The combination with the dashboard and a radiator on an automobile and the hood extending rearwardly from the radiator, of an extension on each side of the radiator, each extension having an opening formed therein, a pair of tubes disposed one on each side of the radiator and concealed by the hood, said tubes having their forward ends projecting through and supported in the openings formed in the radiator extensions and having their rear ends supported by the dashboard, and a source of light and a cooperating parabolic reflector secured to the rear end of each tube to project a beam of parallel rays through the forward end of each tube.

7. The combination with the dashboard and a radiator on an automobile and the hood extending rearwardly from the radiator, of an extension on each side of the radiator, each extension having an opening formed therein, a pair of tubes disposed one on each side of the radiator and concealed by the hood, said tubes having their forward ends projecting through and supported in the openings formed in the radiator extensions and having their rear ends supported by the dashboard, and a source of light and a cooperating parabolic reflector secured to the rear end of each tube to project a beam of parallel rays through the forward end of each tube, said tubes having a length substantially equal to the length of the hood.

8. The combination with the dashboard and a radiator on an automobile and the hood extending rearwardly from the radiator, of an extension on each side of the radiator, each extension having an opening formed therein, a pair of tubes disposed one on each side of the radiator and concealed by the hood, said tubes having their forward ends projecting through and supported in the openings formed in the radiator extensions and having their rear ends supported by the dashboard, and a source of light and a cooperating parabolic reflector secured to the rear end of each tube to project a beam of parallel rays through the forward end of each tube, said hood being extended on each side to conform to the extensions on the radiator.

9. In an automobile having an enclosed engine compartment at its forward end, said compartment being bounded forwardly and rearwardly by upright wall elements, the combination of illuminating means supported by the rear wall element to project a beam in a forward direction within said compartment, the front wall element being provided with a light opening in the path of said beam.

10. In an automobile having an enclosed engine compartment at its forward end, said compartment being bounded forwardly by a radiator and rearwardly by a dash and upwardly and laterally by a hood extending between the radiator and dash, the combination of illuminating means supported by the dash and arranged to project a forward beam under the hood, the radiator being provided with an aperture to pass the beam.

JACOB S. WALCH.